US009092206B2

(12) United States Patent
Rzehak et al.

(10) Patent No.: US 9,092,206 B2
(45) Date of Patent: Jul. 28, 2015

(54) MICROPROCESSOR UNIT CAPABLE OF MULTIPLE POWER MODES HAVING A REGISTER WITH DIRECT CONTROL BITS AND REGISTER POINTER BITS FOR INDIRECT CONTROL

(75) Inventors: Volker Rzehak, Ergolding (DE); Horst Diewald, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 298 days.

(21) Appl. No.: 12/772,442

(22) Filed: May 3, 2010

(65) Prior Publication Data

US 2014/0047247 A1  Feb. 13, 2014

(51) Int. Cl.
*G06F 1/26* (2006.01)
*G06F 1/32* (2006.01)

(52) U.S. Cl.
CPC ............... *G06F 1/26* (2013.01); *G06F 1/3203* (2013.01); *G06F 1/3243* (2013.01); *Y02B 60/1239* (2013.01)

(58) Field of Classification Search
CPC ........... G06F 1/26; G06F 1/32; G06F 1/3203; G06F 1/3243; G06F 1/3287; G06F 9/30105; G06F 9/30138; G06F 9/35; Y02B 60/1239
USPC ........................................................ 713/300
See application file for complete search history.

(56) References Cited

U.S. PATENT DOCUMENTS

| 6,052,766 A * | 4/2000 | Betker et al. ................... 711/200 |
|---|---|---|
| 6,212,645 B1 * | 4/2001 | Tjandrasuwita ............... 713/330 |
| 6,360,327 B1 * | 3/2002 | Hobson .......................... 713/300 |
| 6,510,525 B1 * | 1/2003 | Nookala et al. ................ 713/324 |
| 2006/0026398 A1 * | 2/2006 | Cabillic et al. ................. 712/224 |
| 2006/0149938 A1 * | 7/2006 | Jiang et al. ..................... 712/225 |
| 2006/0179329 A1 * | 8/2006 | Terechko et al. .............. 713/300 |
| 2006/0195707 A1 * | 8/2006 | Rychlik .......................... 713/300 |
| 2007/0288778 A1 * | 12/2007 | Zhuang et al. ................. 713/320 |

* cited by examiner

*Primary Examiner* — Thomas Lee
*Assistant Examiner* — Danny Chan
(74) *Attorney, Agent, or Firm* — Robert D. Marshall, Jr.; Frank D. Cimino

(57) ABSTRACT

A power mode control system for microprocessors offers an unlimited variety of hardware-supported power modes that may satisfy any operating scenario. The microprocessor unit comprises a register that contains particular bit fields for defining selectable power modes. The particular bit fields in the register define pointers to a power mode defining register. Each pointer selects a corresponding bit field in the power mode defining register. The bits in the bit fields of the power mode defining register either directly control a power mode of at least one functional or peripheral blocks of the unit; or they are pointers to a further power mode defining register and the bits in the bit fields of the further power mode defining register directly control a power mode of at least one functional or peripheral blocks of the unit.

6 Claims, 4 Drawing Sheets

MICROPROCESSOR UNIT CAPABLE OF MULTIPLE POWER MODES HAVING A REGISTER WITH DIRECT CONTROL BITS AND REGISTER POINTER BITS FOR INDIRECT CONTROL

CLAIM OF PRIORITY

This application claims priority under 35 U.S.C. 120(a) to German Patent Application No. 10 2009 019 891.1 filed May 4, 2009.

TECHNICAL FIELD OF THE INVENTION

The technical field of this invention is a microprocessor unit capable of multiple power modes. The invention also relates to a method of operating the microprocessor unit capable of multiple power modes.

BACKGROUND OF THE INVENTION

Embedded microcontrollers are capable of different power modes which are usually controlled by dedicated instructions like HALT, SLEEP, DEEP_SLEEP etc. These dedicated instructions require a special handling for switching from one power mode to another, ensuring that the controller returns to the same mode as before. One example is the MSP430 microcontroller of Texas Instruments. It uses power mode control (PMC) bits in the status register which are saved together with the program counter onto the stack during each interrupt request service sequence. These PMC bits control the operational condition directly. For example all clock activities may be stopped inside of peripheral modules depending on the state of the PCM bits.

With such architecture, however, the possible power mode scenarios are limited. Many more power mode scenarios can be generated by executing code. Advanced software solutions e.g. use dynamic voltage-frequency scaling and turn on or off specific selected circuits. A software approach, however, needs more power and performance. The real-time nature of interrupt handling is negatively impacted and may need higher execution speed. The software approach needs some protection to complete, at least, certain parts of power mode modifications so that no locking situation can happen.

SUMMARY OF THE INVENTION

The present invention aims at providing a hardware-supported, fine grained, flexible power mode control system.

According to the invention, the microprocessor unit comprises at least one register or memory that contains particular bit fields for defining selectable power modes. At least some of the particular bit fields in the register or memory define pointers to a power mode defining register. Each pointer selects a corresponding bit field in the power mode defining register. The bits in the bit fields of the power mode defining register either directly control a power mode of one or more functional or peripheral blocks of the unit; or they are pointers to a further power mode defining register and the bits in the bit fields of the further power mode defining register directly control a power mode of one or more functional or peripheral blocks of the unit.

The register holding the particular bit fields is either an existing register of the unit such as a status register, or it is a separate register or memory location added for that purpose.

The inventive power mode control system offers an unlimited variety of power modes that may satisfy any operating scenario. Compared to a software approach the hardware-supported power modes save overhead in software and thereby further reduce power consumption. This is an essential advantage in interrupt-driven applications where many effective power-mode situations may occur and which can be handled by the inventive power mode control system. The power mode control situation can be directly triggered by an interrupt event if accepted.

The invention also provides a method of operating a microcontroller or microprocessor unit capable of multiple power modes. The method comprises the steps of accepting control events, saving the contents of the power mode defining register when a control event is accepted, executing the control event and restoring the contents of the power mode defining register after execution of the control event. In the preferred embodiment, an accepted event contains an index to a bit field of the power mode defining register.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
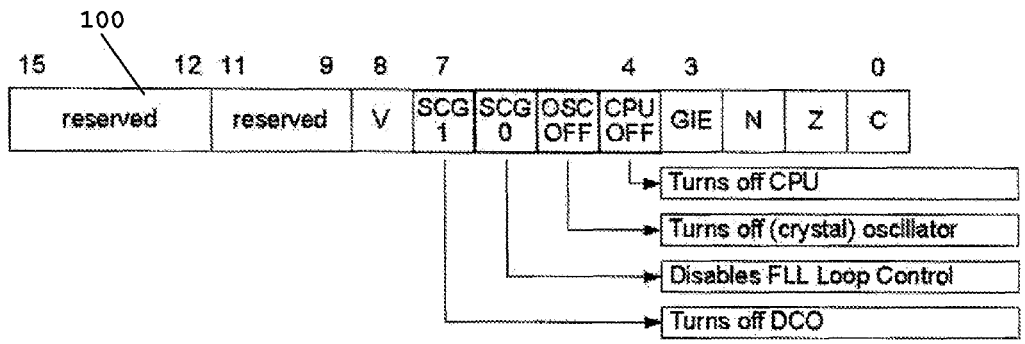
FIG. 1 is a diagram that illustrates bit fields within a status register used to directly control power modes of a microcontroller.

FIG. 1 illustrates a 16 bit field of a status register 100 in a microcontroller. Only bits 4 to 7 are of interest here. In a conventional system (MSP430 of Texas Instruments) these four bits are used to directly control the power modes of the system:

Bit 4 (CPU OFF) turns ON/OFF the CPU;
Bit 5 (OSC OFF) turns ON/OFF the (crystal) oscillator;
Bit 6 (SCG0) Enables/Disables the FLL loop control;
Bit 7 (SCG1) turns ON/OFF the DCO.
In accordance with the invention, while some bits in the status register may directly control a power mode, at least some of these bits (in case of an implementation with a status register that has power mode control bits) or some other reserved bits are used as pointers to a power mode defining register.

Figure 2:
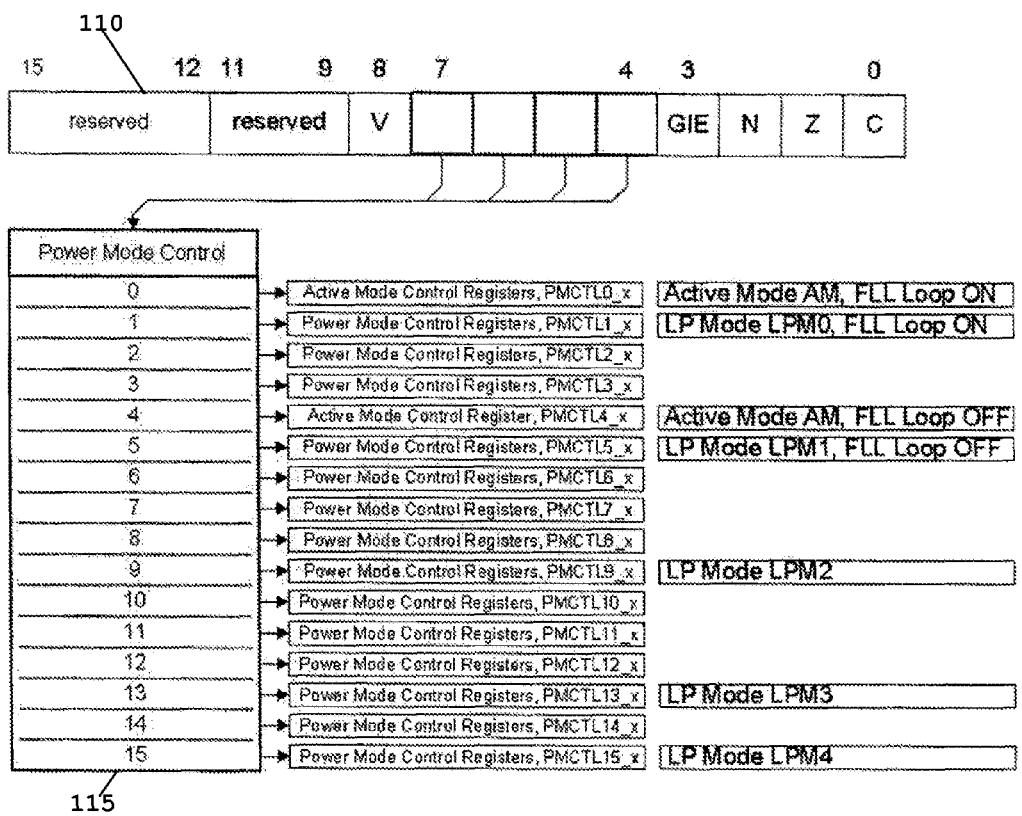
FIG. 2 is a diagram that illustrates the mapping of particular bits within a status register into pointers to a dedicated power mode defining register.

With reference now to FIG. 2, which still assumes an implementation with a status register 110 that has four reserved bits (bits 4 to 7) for power mode control, these four bits constitute pointers 0 to 15 to a set of 16 power mode defining registers PMCTL0_x to PMCTL15_x 115. Each of these registers can be of any length.

Figure 3:
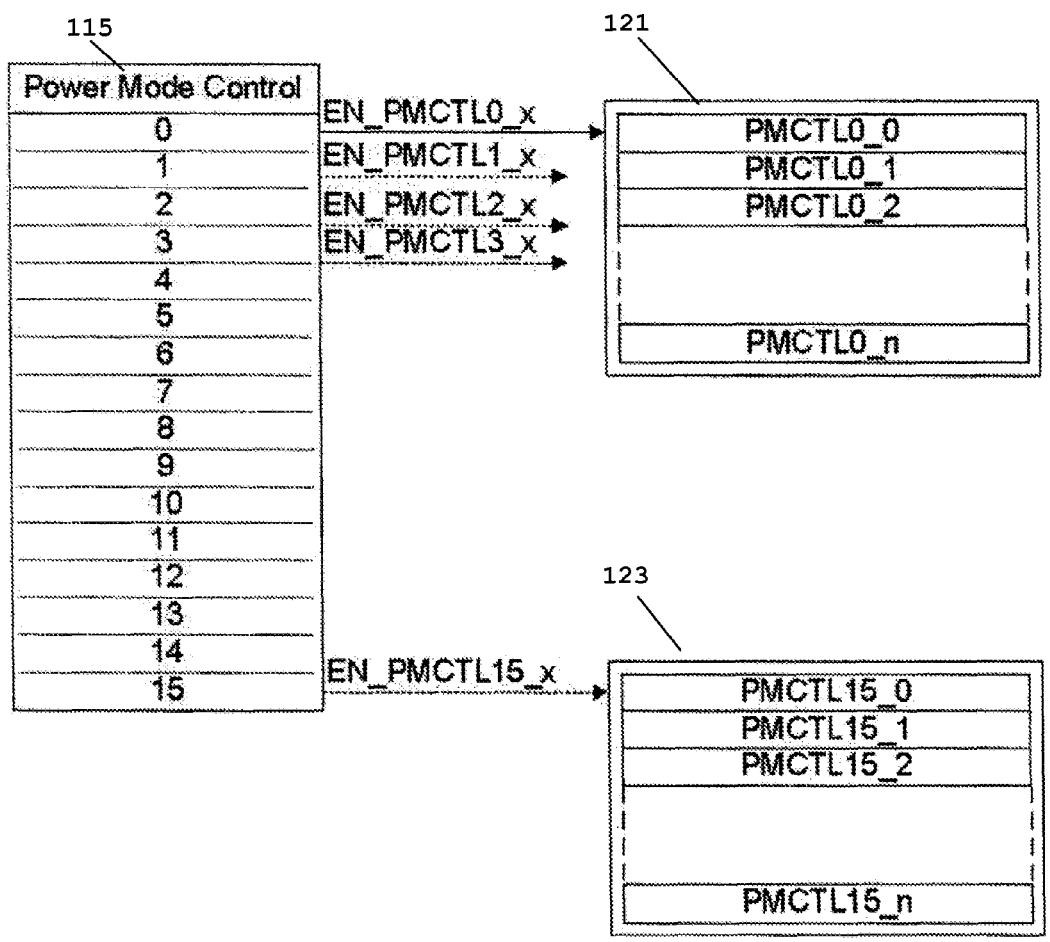
FIG. 3 shows a first implementation of active power mode control registers.
Figure 4:
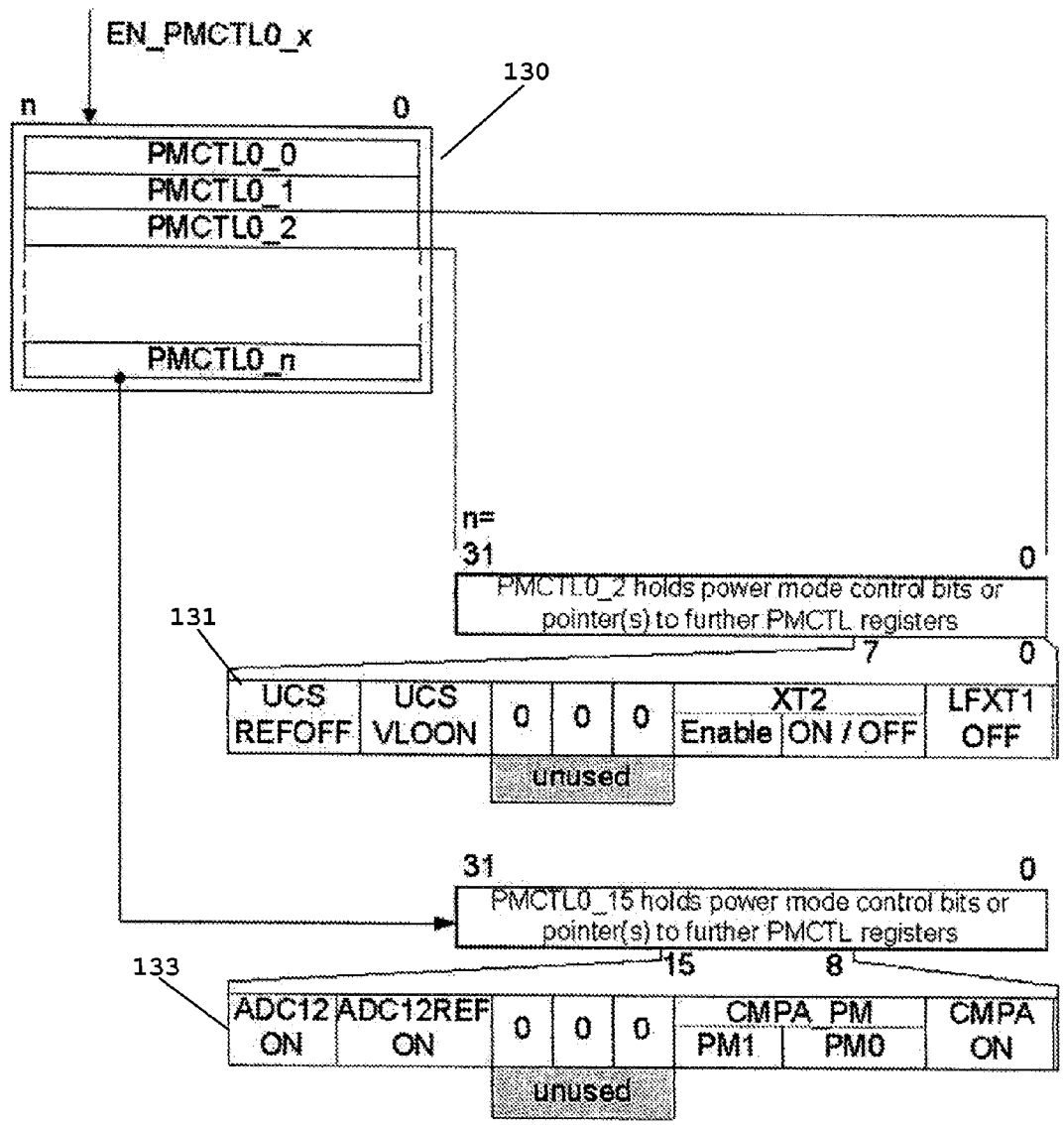
FIG. 4 shows a second implementation of active power mode control registers.

In the particular example shown in FIG. 3, pointer 0 of power mode defining registers 115points to register set 121. The register set 121 may have one or more registers of up to m bits. In the example shown, the bit fields of the registers of register set 121 have a length (m) of 32 bits. In bit field PMCLT0_2, for example, bits 0, 1, 2, 3, 6 and 7 are used to define particular hardware control functions such as on, off, enable, disable etc., and in bit field PMCLT0_n bits 8, 9, 10 and 14, 15 define further power mode control functions. Also illustrated in FIG. 3, pointer 15 of power mode defining registers 115 points to register set 123.

F*igure* 4 illustrates an example of power mode definitions of register set 121. The register PCMTL0_2 has a definition 131. The register PCMTL0_15 has a definition 133. The contents of the bit fields can be direct power control bits or pointers to further power mode control registers. The registers can have identical hardware control functions at the same bit positions, or a collection of totally different hardware control functions. The set of power mode control registers can also support groups of hardware control functions mixed with individual control functions.

The register holding the pointer can be any CPU register in any CPU or controller that responds to control events. In a multi-CPU or multi-controller system each unit may have its own individual power controller.

Figure 5:
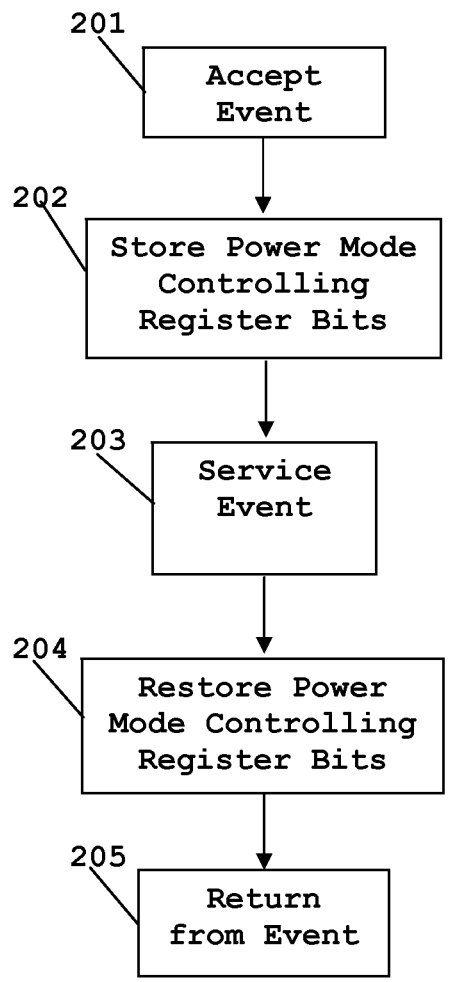
FIG. 5 illustrates operation of the microprocessor of this invention in accepting and servicing an event.

FIG. 5 illustrates the operation of this microprocessor of this invention in response to an event such as an interrupt. In block 201 the microprocessor accepts the event. Accepted events such as an interrupt are used as an index to a particular bit field, the index consisting of a pointer and a field index x. Block 202 stores the power mode controlling register bits during accepting such control events. Block 203 services the event. Block 204 restores the power mode controlling register bits during rewinding the events, including return from the event such as a return-from-interrupt in block 205. The storing and restoring power mode controlling register bits may require no extra execution cycle, or at least is limited to the cycles the storing/restoring of registers requires.

The contents of the power mode defining bit fields, be it direct control of power mode or pointers to registers or memory areas containing such bit fields or pointers, can be defined by hardware (e.g. Initialization or power-up). It can be open to change by user requirements, or it can be protected; in the latter case changes may be admitted only upon the occurrence of specific events, or they may require a specific authorization.

Although the invention has been described hereinabove with reference to a specific embodiment, it is not limited to this embodiment and no doubt further alternatives will occur to the skilled person that lie within the scope of the invention as claimed.

What is claimed is:

1. A microprocessor unit capable of multiple power modes, comprising:
    at least one register containing a bit field including less than all bits of said at least one register, said bit field having a plurality of bit field encodings, wherein
        a first set of said plurality of bit field encodings directly controls at least one of said power modes, and
        a second set of said plurality of bit field encodings define pointers to at least one power mode defining register.

2. The microprocessor unit according to claim 1, wherein:
    at least some of said first set of said plurality of bit field encodings in the register directly controls a power mode of at least one functional block of the microprocessor unit.

3. The microprocessor unit according to claim 1, wherein:
    the bits in the bit fields of the power mode defining register directly control a power mode of at least one functional block of the microprocessor unit.

4. The microprocessor unit according claim 1, wherein:
    the bits in the bit fields of the power mode defining register are pointers to a further power mode defining register and the bits in bit fields of the further power mode defining register directly control a power mode of at least one functional block of the microprocessor unit.

5. The microprocessor unit according claim 1, wherein:
    said register holding said bit field is an existing register of the unit such as a status register, a CPU register and a memory area.

6. The micrFoprocessor unit according claim 1, wherein:
    said register holding said bit field is responsive to control events.

\* \* \* \* \*